Patented Aug. 14, 1951

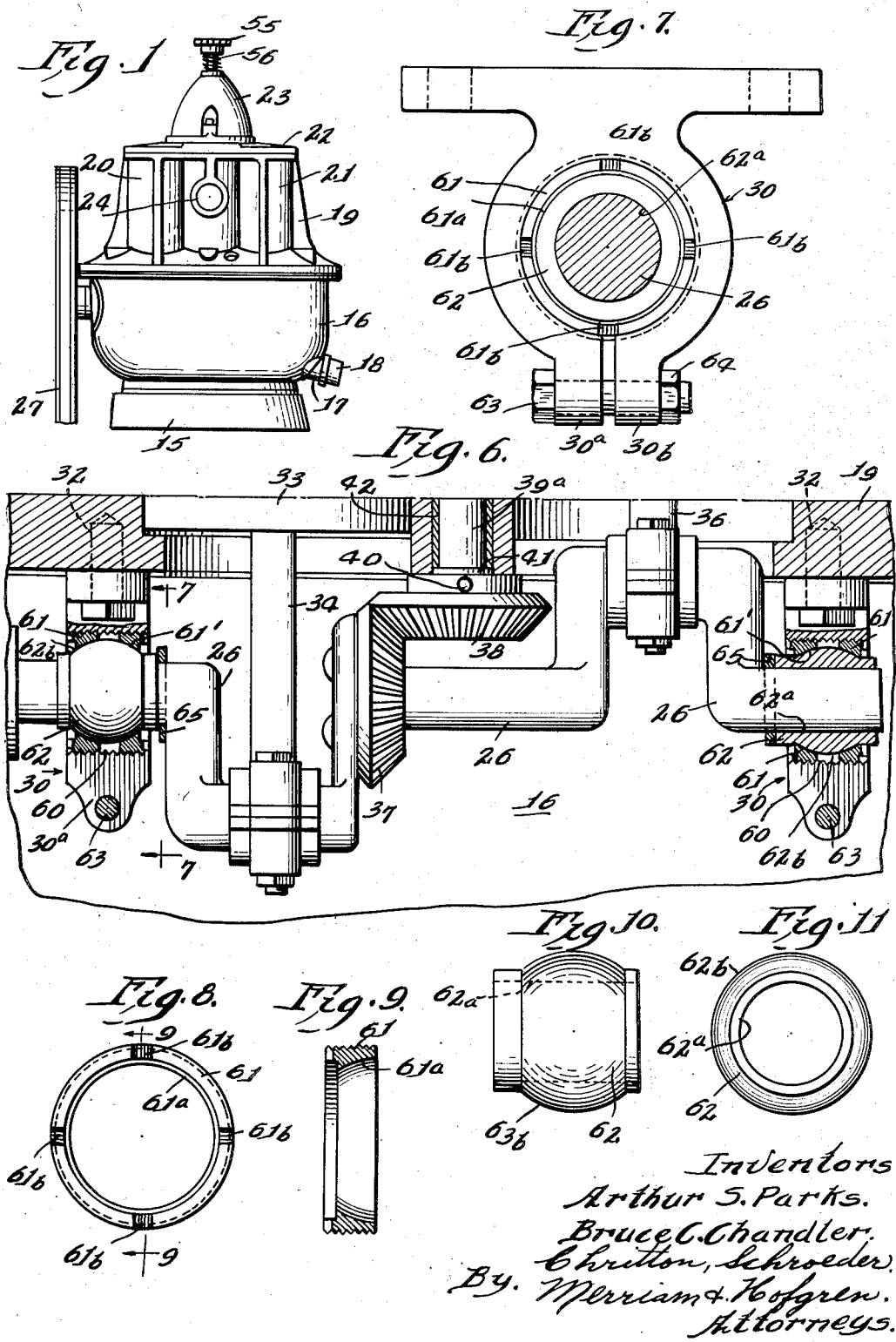

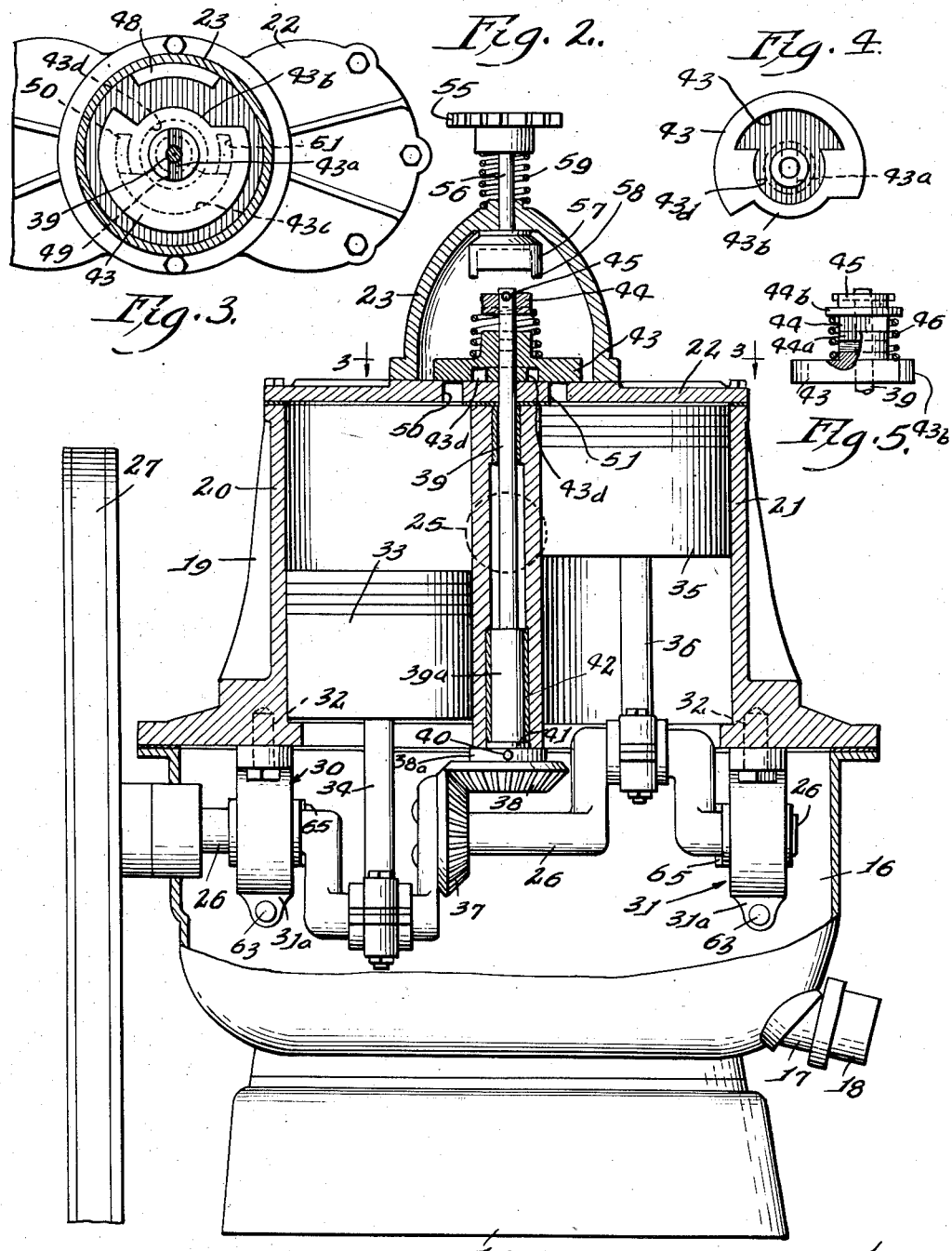

2,564,076

UNITED STATES PATENT OFFICE 2,564,076

ADJUSTABLE CRANKSHAFT BEARING

Arthur S. Parks, Sandwich, and Bruce C. Chandler, Waukegan, Ill., assignors to Sandwich R. V. Pump Co., a corporation of Illinois Application December 16, 1948, Serial No. 65,676

6 Claims. (Cl. 308—59)

This invention relates to a pump, and more particularly to an improved bearing structure for supporting the crankshaft of a pump.

The invention will be illustrated and described as applied to a vacuum pump for use with a mechanical milker having a pulsator or other device for periodically applying vacuum to the inflations of the milker, although it will be understood that the invention is applicable to many other types of apparatus.

In a two cylinder vacuum pump of the character illustrated in the drawings a pair of pistons are reciprocated by the crankshaft, one piston operating in opposed relation to the other. A valve is provided for alternately connecting each cylinder with the pump inlet and exhaust, and in order to coordinate the operation of this valve with the pistons and to simplify the structure the valve is driven from the crankshaft by a rotatable valve driving shaft member extending transversely of the normal axis of the crankshaft. The connection between the crankshaft and the valve driving shaft is through a pair of bevel or mitre gears. Since the teeth of these gears are themselves beveled, in the past it has been found difficult to align the parts so that the teeth mesh properly, and very close tolerances have been required in the manufacture of the parts in order to insure proper meshing.

Even if the gears are meshed properly when the pump is assembled, wear on the gears over a period of use results in improper meshing so that the gears grind or howl. This condition has been very difficult to correct with prior art structures. The valve driving shaft is usually arranged for movement transverse of the normal axis of the crankshaft to bring the gears into closer mesh, but since the teeth of the gears are beveled, movement of only the one gear on the valve driving member without complementary movement of the other gear on the crankshaft cannot insure perfect meshing, and in order to obtain such perfect meshing it is often necessary to move the crankshaft longitudinally of its normal axis.

Furthermore, it has been found that if the crankshaft is movable angularly of its normal axis as well as longitudinally thereof close manufacturing tolerances may be avoided, and when it is necessary to disassemble the pump for any reason it may easily be reassembled since the crankshaft will be automatically aligned so that the gear on the crankshaft meshes properly with the gear on the valve driving member.

In view of the foregoing, the principal feature of this invention is that it provides an improved bearing structure for a pump; a further feature of this invention is that it provides means for mounting the crankshaft in a pump so that said crankshaft is movable longitudinally and angularly of the normal axis of the crankshaft; another feature of this invention is that close manufacturing tolerances may be avoided, making the pump easier and cheaper to manufacture; and an additional feature of this invention is that a pump having a mitre gear on the crankshaft and a complementary mitre gear on the valve driving member may be assembled with greater ease than has heretofore been possible and may readily be adjusted to compensate for wear on the gears and eliminate grinding and howl in the gears.

Other features and advantages of this invention will be apparent from the following specification and from the drawings in which:

Fig. 1 is a side elevation of a pump incorporating the present invention;

Fig. 2 is an enlarged elevation, partly in vertical longitudinal cross section, of the pump of Fig. 1;

Fig. 3 is a fragmentary longitudinal horizontal section taken on the line 3—3 of Fig. 2, said figure utilizing vertical line shading to bring out the structure of the parts rather than to indicate sectioning;

Fig. 4 is a bottom view of the valve member shown in Fig. 3, said figure utilizing vertical line shading to bring out the structure of the parts rather than to indicate sectioning;

Fig. 5 is a detail view, partly in section, of the reversing mechanism in the dome of the pump of Fig. 2, looking from the right thereof.

Fig. 6 is a fragmentary enlarged section of a portion of a pump showing the crankshaft and bearing structure;

Fig. 7 is a vertical section on the line 7—7 of Fig. 5;

Fig. 8 is an end view of one of the bearing supporting rings;

Fig. 9 is a vertical section taken on the line 9—9 of Fig. 7;

Fig. 10 is a side elevation of one of the bearings; and

Fig. 11 is an end view of the bearing looking from the right of Fig. 9.

Referring now more particularly to the drawings, and first to Fig. 1 the pump comprises a base 15 upon which is mounted a crankcase 16 having a bottom oil drain 17 closed by a cap 18. A cylinder block 19 is mounted on the crankcase and is provided with cylinders 20 and 21. The top of the cylinder block is closed by a cylinder head 22 upon which is mounted a dome 23. An exhaust opening 24 is provided on one side of the cylinder block (see Fig. 1) and an inlet opening 25 is provided on the other side of the cylinder block (see Fig. 2).

Referring now more particularly to Fig. 2, a crankshaft 26 is mounted within the crankcase, this crankshaft extending throughout substantially the entire length of the crankcase and being coupled to a pulley 27 outside the crankcase, which may be driven by motor means not shown. Bearing housings designated generally at 30 and 31 support the crankshaft adjacent each end within the crankcase, these bearing housings being mounted below the cylinder block 19 by means of bolts 32 tapped into the bottom of the cylinder block.

A piston 33 in the cylinder 20 is connected to the crankshaft by a connecting rod 34, and a piston 35 in the cylinder 21 is connected to the crankshaft by a connecting rod 36, these pistons being reciprocable in opposed relation upon rotation of the crankshaft 26.

A bevel or mitre gear 37 is mounted on the crankshaft and is rotatable therewith and meshes with another bevel or mitre gear 38 pinned to a rotatable valve driving shaft member 39. The member 39 has a lower enlarged portion 39a which is locked by a pin 40 on a plate 38a integral with the bevel gear 38, and a thrust washer 41 is carried on the enlarged portion 39a and bears against a bushing 42 carried in the cylinder housing 19 between the cylinders 20 and 21. The shaft 39 extends transversely of the normal axis of the crankshaft up through the cylinder block between the cylinders 20 and 21 and through the cylinder head 22 into the dome 23, and at its upper end the member 39 is journalled through a valve member 43 and a pressure member 44. The pressure member 44 is normally rotatable with the shaft 39, being held in frictional engagement therewith by a pin 45 which is journalled through the member 39 and which rides in an elongated recess in the top surface of the pressure member 44. The pressure member 44, which is generally elliptical in shape, has depending lugs 44a on its underside adjacent opposite sides of the shaft 39, these lugs being received in a well 43a in the top surface of the valve 43 for coupling the members 43 and 44. The lugs 44a normally do not extend to the bottom of the well 43a. A spring 46 is carried between the valve 43 and a shoulder 44b on the member 44 and acts normally to keep the member 44 coupled to the shaft 39 through the pin 45.

Fig. 3 shows the valve member 43 on the cylinder head and shows its cooperation with the ports which are provided in the cylinder head. In this figure that portion of the cylinder head in which the ports are located is shaded in vertical lines. This shading does not indicate a section through the structure, but is utilized to clarify the construction. The cylinder head 22 is provided with an arcuate inlet port 48, this port being so located that it is never covered by the valve 43, and this port communicating through a passage in the cylinder block with the inlet opening 25. On the opposite side of the cylinder head, but spaced closer to the axis of the member 39, is an arcuate exhaust port 49 which communicates through another passage in the cylinder block with the exhaust opening 24. The port 49 is so located that it is always covered by the valve 43. Arranged along the longitudinal axis of the cylinder head equally spaced on opposite sides of the shaft 39 are arcuate ports 50 and 51, these ports being placed so that they may be covered or uncovered by the valve 43 depending upon the rotational position of such valve. The port 50 communicates with the cylinder 20 and the port 51 communicates with the cylinder 21.

Referring to Fig. 4 which is a view of the valve 43 from the bottom, it may be seen that the valve is generally in the form of a disc having a cutaway portion 43b. The radius of the arcuate edge surface of this cutaway portion is such that the portion may alternately uncover the ports 50 and 51, but may not uncover the exhaust port 49. The bottom of the valve is recessed as shown in vertically shaded lines in Fig. 4 to provide a chamber 43c and a generally semi-circular passage 43d which communicates at both its ends with the chamber 43c. The chamber 43c is so located that it may be in communication with either of the ports 50 or 51, while the passage 43d is so located that it (or a projection extended arcuately through the chamber 43c) is always in communication with the exhaust port 49.

In the operation of the pump the pistons 33 and 35 are reciprocated in the respective cylinders as earlier described and the valve 43 is rotated in synchronism with this reciprocation. The valve is so placed that during the down stroke of the piston 35 the port 51 is uncovered by the cutaway portion of the valve, and the inlet port 48 is in communication with the port 51 so that fluid is drawn from said inlet port and through the port 51 into the cylinder 21. By the time the piston 35 has completed its down stroke and is ready to start its up stroke the valve has rotated so that the port 51 is about to be covered by the valve and will no longer be in communication with the port 48, but will be in communication during said up stroke with the port 49 through the chamber 43c and the passage 43d in the valve so that during the up stroke of the piston 35 air is forced out of the cylinder 21 and into the exhaust passage. Since the pistons operate in opposed relation the action of the piston 33 in the cylinder 20 is just the opposite during the cycle above described, and during the up stroke of the piston 33 (which occurs during the first portion of this cycle) ports 49 and 50 are in communication through the passage 43d and chamber 43c in the valve, while during the down stroke of the piston 33 (which occurs during the last half of the cycle above described) the ports 50 and 48 are in communication since the port 50 is uncovered by the cutaway portion of the valve.

A mechanism is also provided for reversing the operation of the pump so that the pump operates as a pressure pump rather than as a vacuum pump. A reversing knob 55 carries a plunger 56 which extends through a fluid-sealed opening in the top of the dome 23. At the bottom of the plunger 56 is an inverted cup-shaped operating member 57 having a lower flange 58 adapted to engage the opposite ends of the shoulder 44b on the elongated or elliptical pressure member 44, the top of the shaft 39 and the pin 45 extending into the hollow or cup portion of the member 57. The reversing mechanism is normally retained in its upper or inoperative position as shown by means of a spring 59. However, if the knob 55 is pushed downwardly to bring the lower surface of the flange 58 into engagement with the shoulder 44b and sufficient pressure is applied to compress the spring 46 the pin 45 will no longer lie in the longitudinal recess in the top surface of the member 44, and the member 44 and the valve 43 will be rotatable with respect to the valve driving shaft 39. Rotation of the pulley 27 through one-half revolution will reverse the position of the pistons without rotating the valve, and upon operation of the pump with the valve in this reversed position air will be drawn in through the exhaust passages and supplied under pressure to the inlet passages.

As pointed out earlier in this specification, pumps of this character have been subject to howling and grinding of the gears 37 and 38; such pumps have been difficult to assemble with the gears 37 and 38 in proper mesh; and it has been virtually impossible to cause these gears to mesh properly once they have worn. Furthermore, because of the accurate mesh required by the bevelled teeth of the gears 37 and 38, very close tolerances were required in the machining of the parts to provide proper alignment of the crankshaft 26. The present invention provides a means for obviating these disadvantages and for facilitating the manufacture and maintenance of the pump.

The bearing housings 30 and 31 are each expansible, these housings being split as shown in Fig. 6. The housing 31 is provided with a central threaded bore as shown at 60 in Fig. 5, and a pair of threaded bearing supporting rings are adapted to be threaded in this bore, the outer of these rings being designated at 61 and the inner of said rings being designated at 61'. It should be noted that in connection with the bearing structure the construction is the same at each end of the crankshaft and consequently only one construction will be described.

A bearing 62 is adapted to have the crankshaft journalled therein, the bore 62a of this bearing providing a bearing surface for said crankshaft 26. A portion of the outer surface of the bearing 62 is generally spherical as shown at 62b, and the rings 61 and 61' each have concave inner surfaces 61a complementary to said spherical surface and adapted to engage said spherical surface on both sides of the median line thereof as shown best in Fig. 6.

The rings 61 are each provided at one end with a plurality of recesses 61b spaced at 90° around the end of the ring, oppositely disposed recesses being adapted to receive a tool to facilitate adjustment of the rings in the respective housings 30 and 31. Each of the housings 30 and 31 has a bolt 63 journalled through depending lugs 30a, 30b and 31a, 31b adjacent the split portion of the respective housings so that after the pump has been assembled a nut 64 may be drawn up on each bolt 63 to clamp the expansible bearing housing against rings 61 to prevent the bearing structure from working loose. Adjacent each end of the crankshaft a thrust washer 65 is provided, these washers being mounted on the shaft between a shoulder on the shaft and one end of the respective bearing 62.

A crankshaft constructed in accordance with this invention does not require the close manufacturing tolerances heretofore necessary to insure proper meshing of the mitre gears, and after the gears have worn they can readily be brought back into proper mesh since the crankshaft is supported in the housing for movement longitudinally and angularly of the normal axis of the crankshaft. While the shaft and its bearings 62 are loosely carried in each of the housings 30 and 31 the shaft may be positioned so that the gears 37 and 38 are in proper mesh. With the shaft held in this position the rings 61 and 61' are turned into engagement with the spherical portion of the outer surface of the bearing to obtain the correct longitudinal position, and any misalignment of any of the parts is automatically compensated for by the ball and socket type construction of the rings and bearings which allows angular movement for proper alignment. After the pump has been in use and the gears have worn so that they are no longer properly in mesh the valve driving member 39 can be lowered to any desired position in accordance with previously known constructions, as for example by removing the shaft 39 and tapping the bushing 42 downwardly, and proper mesh can be insured by axial and angular movement of the crankshaft 26. The axial or longitudinal movement to bring the gears closer together is provided merely by inserting a pronged wrench or other tool into the recesses 61b in the outer ring in housing 31 and turning this ring so that it moves away from the bearing and following the same procedure with the inner ring in housing 30. Now if the other rings are turned the crankshaft will be moved axially to a new position, and while the crankshaft is still loose in the bearings pressure of the bevelled gear teeth against each other will automatically align the crankshaft so that the teeth are in proper mesh. Again it is desired to point out that when this adjustment is made axial movement alone of the crankshaft is not sufficient since the bevelled teeth will not properly mesh in a new position without angular movement as well. During axial adjustments the thrust washers 65 maintain the proper position between the crankshaft and the bearing.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. In a pump having a crankshaft, a mitre gear on said crankshaft and a member driven by said gear, means for rotatably supporting said crankshaft, comprising: a bearing housing having a threaded bore; a bearing adapted to have said crankshaft journalled therein; and means for supporting said bearing within said housing for movement longitudinally and angularly of the normal axis of the crankshaft, said last mentioned means comprising a pair of rings threaded into said bore, one on each side of the median line of said bearing.

2. In a pump having a crankshaft, a mitre gear on said crankshaft and a member driven by said gear, means for rotatably supporting said crankshaft, comprising: a bearing housing having a bore; a bearing adapted to have said crankshaft journalled therein, a portion of the outer surface of said bearing being generally spherical; and movable means engaging said spherical portion on both sides of the median line thereof for supporting said bearing within said housing for movement longitudinally and angularly of the normal axis of said crankshaft, said last mentioned means comprising a pair of rings movable in said bore longitudinally of the normal axis of the crankshaft and having surface portions adapted to engage said spherical surface.

3. In a pump having a crankshaft, a mitre gear on said crankshaft, a rotatable member extending transversely of the normal axis of said crankshaft and a mitre gear on said member meshing with the mitre gear on said crankshaft, means for rotatably supporting said crankshaft, comprising: a bearing housing having a threaded bore; a bearing adapted to have said crankshaft journalled therein, a portion of the outer surface of said bearing being generally spherical; and means for supporting said bearing within said housing for movement longitudinally and angularly of the normal axis of the crankshaft, said last mentioned means comprising a pair of rings threaded into said bore and having concave inner surface portions complementary to said spherical surface and adapted to engage said spherical surface on both sides of the median line thereof.

4. Apparatus of the character claimed in claim 3 wherein said rings have a portion on one end thereof adapted to engage a tool to facilitate adjustment of said rings in said housing.

5. In a pump having a crankshaft, a mitre gear on said crankshaft, a rotatable member extending transversely of the normal axis of said crankshaft and a mitre gear on said member meshing with the mitre gear on said crankshaft, means for rotatably supporting said crankshaft, comprising: an expansible bearing housing having a threaded bore; a bearing adapted to have said crankshaft journalled therein, a portion of the outer surface of said bearing being generally spherical; means engaging said spherical portion on both sides of the median line thereof for supporting said bearing within said housing for movement longitudinally and angularly of the normal axis of the crankshaft, said last mentioned means comprising a pair of rings threaded into said bore and having concave inner surface portions complementary to said spherical surface and adapted to engage said spherical surface on both sides of the median line thereof; and means for clamping said expansible bearing housing against said rings.

6. In a pump having a crankshaft, a mitre gear on said crankshaft, a rotatable member extending transversely of the normal axis of said crankshaft and a mitre gear on said member meshing with the mitre gear on said crankshaft, means for rotatably supporting said crankshaft, comprising: an expansible bearing housing having a threaded bore; a bearing adapted to have said crankshaft journalled therein, a portion of the outer surface of said bearing being generally spherical; means for supporting said bearing within said housing for movement longitudinally and angularly of the normal axis of the crankshaft, said last mentioned means comprising a pair of rings threaded into said bore and having concave inner surfaces complementary to said spherical surface and adapted to engage said spherical surface on both sides of the median line thereof, said rings each having a plurality of recesses on one end thereof adapted to receive a tool to facilitate adjustment of said rings in said housing; means for clamping said expansible bearing housing against said rings; and a thrust washer on said crankshaft between a shoulder on said shaft and one end of said bearing for positioning said crankshaft relative to said bearing.

ARTHUR S. PARKS.
BRUCE C. CHANDLER.

REFERENCES CITED

The following references are of record in the file of this patent:

UNITED STATES PATENTS

| Number | Name | Date |
| --- | --- | --- |
| 1,734,244 | Bingman | Nov. 5, 1929 |
| 1,875,682 | Walker | Sept. 6, 1932 |
| 2,500,978 | Bylund | Mar. 21, 1950 |

FOREIGN PATENTS

| Number | Country | Date |
| --- | --- | --- |
| 169,978 | Great Britain | Oct. 3, 1921 |